2,767,198
Patented Oct. 16, 1956

2,767,198

ENOLATES OF 21-FORMYL STEROIDS AND PROCESS

John A. Hogg and Frank H. Lincoln, Jr., Kalamazoo, Mich., assignors to The Upjohn Company, Kalamazoo, Mich., a corporation of Michigan No Drawing. Application August 30, 1952,
Serial No. 307,386

20 Claims. (Cl. 260—397.4)

This invention relates to certain 20-keto-21-formylsteroids, alkali-metal enolates thereof, and to a process for the production thereof.

It is an object of the present invention to provide novel 20-keto-21formylsteroids and alkali-metal enolates thereof. Another object is the provision of a process for the production thereof. Other objects will be apparent to those skilled in the art to which this invention pertains.

The novel compounds of the present invention may be represented in their enolic form by the following formula:

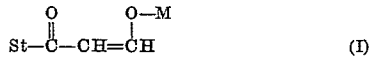
(I)

wherein M is hydrogen or an alkali metal and wherein St represents a cyclopentanopolyhydrophenanthrene nucleus attached to the above-identified side chain at carbon atom 17. The novel compounds of the present invention may or may not have the angular methyl groups attached to carbon atom 10 or 13 and the steroid nucleus may possess an $\alpha$-hydroxy or $\beta$-hydroxy group, groups hydrolyzable or convertible thereto, e. g., acyloxy groups, ether groups, or the like, or ketonic oxygen or groups hydrolyzable or convertible thereto, e. g., a dialkyl ketal, a glycol ketal, an enol acylate, enol ether, or enamine, or the like, at either carbon atom 3 or 11, or at both positions. Moreover the steroid nucleus may have a hydrogen, hydroxy group, an oxido group, a halogen, e. g., chlorine, bromine, or iodide, or a double bond or any other non-interfering group attached at carbon atom 17 or at any other position of the steroid nucleus.

According to the method of the present invention, a 20-keto-21-formylsteroid of the present invention (I) is prepared by contacting a compound represented by the following formula:

(II)

wherein St has the value given for Formula I, with an alkyl ester of formic acid in the presence of an alkali-metal base to produce an alkali-metal enolate of a 20-keto-21-formylsteroid (I). Acidification of a solution of an alkali-metal enolate of a 20-keto-21-formylsteroid of the present invention (I, M=alkali metal) is productive of the corresponding free 20-keto-21-formylsteroid (I, M=hydrogen).

The compounds of the present invention are useful precursors to known and new compounds, many of which are physiologically active. For example, treatment of 11-keto-21-formylprogesterone or an alkali-metal enolate thereof with about two molar equivalents of bromine in methanol, preferably in the presence of potassium acetate or the like, is productive of 11-keto-21,21-dibromo-21-formylprogesterone, which upon treatment with sodium methoxide in methanol is productive of 3,11-diketo-4,17(20)-pregnadiene-21-oic acid methyl ester. After protecting the latter compounds 3-ketone with a glycol ketal or the like, e. g., the 3-ethylene glycol ketal, prepared by reacting 3,11-diketo-4,17(20)-pregnadiene-21-oic acid methyl ester with ethylene glycol in benzene in the presence of an acid catalyst, said compound is converted, using lithium aluminum hydride in ether followed by mild acid hydrolysis, to 11$\beta$,21-dihydroxy-4,17(20)-pregnadiene-3-one. This latter compound or a 21-acyloxy ester thereof can be converted with osmium tetroxide and hydrogen peroxide or equivalent oxidizing agent to the physiologically active 11$\beta$,17$\alpha$,21-trihydroxy-4-pregnene-3,20-dione (Kendall's Compound F) according to methods well known in the art [Prins and Reichstein, Helv. Chim. Acta, 25, 300 (1942); Ruzicka and Mueller, ibid., 22, 755 (1939)].

Many known and new etiocholanic acids are prepared by treatment of a 21-formylsteroid of the present invention with hydrogen peroxide in methanol or other suitable solvent. For example, contacting 3$\alpha$-hydroxy-21-formylprepnane-11,20-dione with a molar equivalent or excess of thirty percent hydrogen peroxide at room temperature was productive of the known 3$\alpha$-hydroxy-11-ketoetiocholanic acid [Gallagher and Belleau, J. Am. Chem. Soc., 74, 2819 (1952)]. These etiocholanic acids, upon successive reaction with thionyl chloride or oxalyl chloride, diazomethane, and finally acetic acid, are productive of 20-keto-21-acetoxysteroids, some of which are physiologically active, e. g., corticosterone acetate.

The preferred steroids of the novel compounds of the present invention may be represented by the following formula:

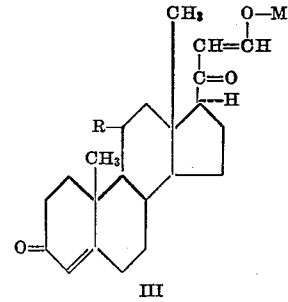
III wherein R is hydrogen, $\alpha$-hydroxy, $\beta$-hydroxy, or ketonic oxygen (=O), and wherein M is hydrogen or an alkali metal, preferably sodium or potassium. Since the A ring of the above-described steroids possesses a $\Delta^4$-3-ketone system typical of the physiologically active adrenal cortical hormones, said compounds are readily converted to physiologically active steroids in the manner described above, and of the compounds of the present invention, the compounds of Formula III are the preferred precursors of said physiologically active hormones.

In carrying out the process of the present invention, a 20-ketosteroid which may be represented by Formula II is dissolved in an alkanol, or in a solvent which is non-reactive under the conditions of the reaction, such as, for example, benzene, toluene, ether, a hydrocarbon, mixture of one or more of these and an alkanol, or the like, and admixed with the selected alkyl formate in the presence of an alkali-metal base. Alkyl formates wherein the alkyl group contains from one to eight carbon atoms, inclusive, and especially methyl formate and ethyl formate, are preferred in carrying out the process of the present invention. Alkali-metal alkoxides are the preferred reaction bases, especially sodium methoxide, sodium ethoxide and potassium tertiary butoxide, although the alkali metals, e. g., sodium, potassium, lithium, their amides, hydrides, or the like, may also be used.

The selected alkyl ester of formic acid is admixed with the steroid in a solvent described above and the mixture is maintained at a temperature between about zero degrees centigrade and the boiling point of the reaction mixture, preferably between about room temperature, e. g., twenty to thirty degrees centigrade, and about sixty degrees centigrade, until the reaction is deemed substantially complete, usually between about one-half hour and about three days. When the ketone at carbon atom 20 is the only ketone in the steroid molecule, with the exception of a ketone at carbon atom 11 or other kindred position, the reaction is sometimes advantageously carried out at temperatures substantially above room temperature, e. g. between about forty degrees centigrade and the boiling point of the reaction mixture.

It was found, when carrying out the process of the present invention with a $\Delta^4$-3,20-diketosteroid, that the reaction product, instead of being a mixture of products formylated at carbon atoms 2, 12 when a ketone is present in the 11 position, or 21, was essentially a steroid formylated at carbon atom 21.

Optimum yields of a 21-formyl-mono-ketosteroid of Formula I are usually obtained when about a molar equivalent each of alkyl formate and alkali-metal base to starting steroid or amounts in substantial excess of a molar equivalent each are employed in carrying out the process of the present invention, whereas optimum yields of a 21-formylsteroid of Formula III are usually obtained when about a molar equivalent of alkali-metal base and about a molar equivalent or more of alkyl formate to starting steroid are employed.

The reaction product, i. e., an alkali-metal enolate of a 20-keto-21-formylsteroid, usually precipitates from the reaction mixture during the reaction when a substantially non-ionic reaction solvent is used whereas the reaction product usually remains in solution when substantial amounts of methanol, ethanol, or the like, are employed as the reaction solvent.

Isolation of the alkali-metal enolate of the 20-keto-21-formylsteroid of the reaction is usually accomplished by adding ether, pentane, hexane, methylene chloride, or the like, to the reaction mixture, thus completely precipitating the alkali-metal enolate. Filtering the precipitated alkali-metal enolate, washing with ether, or the like, and then drying is productive of substantially pure alkali-metal enolate.

The alkali-metal enolates are usually high melting, sometimes colored solids which can be purified by dissolving in water, acidifying, filtering, dissolving in benzene, and then adding a molar equivalent of methanolic alkali-metal alkoxide, or the like, thus precipitating the purified alkali-metal enolate.

Acidification of a solution, e. g., methanolic, ethanolic, aqueous, or the like, of an alkali-metal enolate of the present invention (I, M=alkali metal) with hydrogen chloride, hydrochloric acid, sulfuric acid, acetic acid, or the like, is productive of a free 21-formyl-20-ketosteroid (I, M=hydrogen). Filtering the precipitate and drying, when water is the solvent for the alkali-metal enolate, or adding a large volume of water, filtering, and then drying, when methanol, ethanol, or the like, is the solvent, is productive of substantially pure free enol.

The compounds of the present invention, i. e., 20-keto-21-formylsteroids represented by Formula I, may be isolated and purified as described above, or used without purification or isolation in further synthesis such as, for example, in the production of etiocholanic acids which in turn may be converted to physiologically active steroids according to methods known in the art, or in the production of $\Delta^{17(20)}$-21-acids or esters thereof as described above.

The following examples are illustrative of the process and products of the present invention but are not to be construed as limiting.

*Example 1.—3α-hydroxy-21-formylpregnane-11,20-dione and sodium enolate*

A mixture of 7.6 milliliters of a 3.4 N methanolic sodium methoxide, 45 milliliters of anhydrous benzene, and five milliliters of absolute ethanol was distilled until 25 milliliters of distillate was collected whereafter 6.5 milliliters of ethyl formate was added to the cooled distillation residue and the whole stirred for fifteen minutes. To the stirred solution was thereafter rapidly added a solution of 8.3 grams (0.025 mole) of 3α-hydroxypregnane-11,20-dione [Von Euw, Lardon and Reichstein, Helv. Chim. Acta, 27, 821 (1944)] in 100 milliliters of anhydrous benzene. The reaction mixture was heated at fifty to sixty degrees centigrade for two hours during which time considerable precipitation of product occurred. The cooled reaction mixture was mixed with 250 milliliters of anhydrous ether and the whole maintained at room temperature for about sixteen hours. The precipitate was then filtered from the reaction mixture, washed with ether, and dried in vacuo to yield 6.1 grams of an ivory colored sodium enolate of 3α-hydroxy-21-formylpregnane-11,20-dione. The sodium enolate was readily soluble in water and gave an orange color with aqueous ferric chloride. Acidification of an aqueous solution of the above-described sodium enolate precipitated as a white powder 3α-hydroxy-21-formylpregnane-11,20-dione, which, after drying, melted at 95 to 102 degrees centigrade, had the analysis given below, and displayed an orange-red color with alcoholic ferric chloride.

*Analysis.*—Calculated for $C_{22}H_{32}O_4$: C, 73.30; H, 8.95. Found: C, 73.03; H, 8.99.

3α-HYDROXY-11-KETOETIOCHOLANIC ACID

To a solution of two grams (0.0057 mole) of 3α-hydroxy-21-formylpregnane-11,20-dione in fifty milliliters of methanol was added five milliliters of thirty percent hydrogen peroxide and the whole was maintained at room temperature for three days whereafter the reaction mixture was distilled to dryness at reduced pressure and room temperature. The distillation residue was extracted with an aqueous sodium bicarbonate solution which was then acidified whereupon 3α-hydroxy-11-ketoetiocholanic acid precipitated therefrom and after drying weighed 1.11 grams and melted at 260 to 268 degrees centigrade. Crystallization of the precipitate from 25 milliliters of methanol yielded needles melting at 286 to 292 degrees centigrade and had an $[\alpha]_D^{22}$ of plus 83 degrees. [Reported, Gallagher and Belleau, J. Am. Chem. Soc., 74, 2819 (1952), M. P. 289 to 292 degrees centigrade, $[\alpha]_D$ plus eighty degrees.] The structure of the thus-produced 3α-hydroxy-11-ketoetiocholanic acid was proven by conversion to the known 3α-acetoxy-11-ketoetiocholanic acid methyl ester melting at 148 to 150 degrees centigrade. (Reported, ibid., M. P., 149 to 151 degrees centigrade.)

*Example 2.—3β-hydroxy-21-formylallopregnane-11,20-dione and potassium enolate*

Following the procedure of Example 1, the sodium enolate of 3β-hydroxy-21-formylallopregnane-11,20-dione is prepared by the reaction of 3β-hydroxyallopregnane-11,20-dione [Stork, et. al., J. Am. Chem. Soc., 73, 3546 (1951)] with methyl formate and potassium tertiary butoxide. Acidification of an aqueous solution of the potassium enolate with hydrochloric acid is productive of a precipitate of 3β-hydroxy-21-formylallopregnane-11,20-dione, which upon reaction with hydrogen peroxide, according to the procedure of Example 1, is productive of 3β-hydroxy-11-ketoetioallocholanic acid which, when crystallized from acetone and water, melts at 272 to 274 degrees centigrade [Mason, et al., J. Biol. Chem., 120, 719 (1937)].

In the same manner as the process described in Examples 1 and 2, the following compounds are prepared by reaction of the selected steroid with an alkyl formate and an alkali-metal base: 3α-hydroxy-21-formylallopregnane-11,20-dione and 3β-hydroxy-21-formylpregnane- 11,20-dione from 3α-hydroxyallopregnane-11,20-dione and 3β-hydroxypregnane-11,20-dione, respectively, 3α,-11β- and 3β,11β-dihydroxy-21-formylpregnane-20-one and 3α,11β- and 3β,11β-dihydroxyallopregnane-20-one from 3α,11β- and 3β,11β-dihydroxypregnane-20-one and 3α,11β- and 3β,11β-dihydroxyallopregnane-20-one, respectively.

Reacting 3β,11β-dihydroxy-21-formylallopregnane-20-one with hydrogen peroxide according to method described in Example 1 is productive of 3β,11β-dihydroxyetioallocholanic acid which, when esterified with diazomethane yield 3β,11β-dihydroxyetioallocholanic acid methyl ester melting, after crystallization from acetone and ether, at 237 to 238.5 degrees centigrade [Von Euw and Reichstein, Helv. Chim. Acta, 30, 205 (1947)].

*Example 3.—3α,17α-dihydroxy-21-formylpregnane-11,20-dione and sodium enolate*

In exactly the same manner as described in Example 1, 3.48 grams (0.010 mole) of 3α,17α-dihydroxypregnane-11,20-dione [Sarett, J. Am. Chem. Soc., 70, 1454 (1948)] in fifty milliliters of benzene and five milliliters of ethanol was reacted with 2.6 milliliters of ethyl formate and 3.04 milliliters of 3.4 N methanolic sodium methoxide in a solution of twenty milliliters of benzene and two milliliters of absolute ethanol, ten milliliters of which had been distilled. The bright yellow sodium enolate of 3α,17α-dihydroxy-21-formylpregnane-11,20- dione which precipitated was filtered from the reaction mixture and after drying found to weigh 2.59 grams. The sodium enolate in water gave a dark violet color with ferric chloride. Acidification of an aqueous solution of the sodium enolate precipitated 3α,17α-dihydroxypregnane-11,20- dione which, after drying, melted at 135 to 145 degrees centigrade and had the analysis given below. An alcoholic solution of the latter compound gave a deep red solor with ferric chloride.

*Analysis.*—Calculated for $C_{22}H_{32}O_5$: C, 70.18; H, 8.57. Found: C, 69.39; H, 8.60.

In a similar manner, the following compounds and the alkali-metal enolates thereof are prepared by reacting the selected 20-ketosteroid with an alkali-metal base: 3β,17α-dihydroxy-21-formylpregnane-11,20-dione and 3α,17α- and 3β,17α-dihydroxy-21-formylallopregnane-11,20-dione from 3β,17α-dihydroxypregnane-11,20-dione and 3α,17α- and 3β,17α-dihydroxyallopregnane-11,20-dione, respectively.

In the same manner as described in Example 1, 3α,17α-dihydroxyallopregnane - 11,20 - dione is converted to 3α,17α-dihydroxy-11-ketoetioallocholanic acid by the action of hydrogen peroxide. Crystallization of the latter compound from acetone and water is productive of crystalline 3α,17α-dihydroxy-11-ketoetioallocholanic acid melting at 282 to 284 degrees centigrade.

*Example 4.—3α-acetoxy-21-formyl-5,16-pregnadiene-20-one and sodium enolate*

A suspension of 1.08 grams of sodium methoxide in 25 milliliters of benzene and four milliliters of ethyl formate was stirred at room temperature for thirty minutes whereafter a solution of 3.54 grams (0.010 mole) of 3-acetoxy-5,16-pregnadiene-20-one in 75 milliliters of anhydrous benzene was rapidly added. The stirred solution was maintained at room temperature for 6.5 hours, during which time some gelatinous solid precipitated, and 150 milliliters of anhydrous ether was then added thereto with stirring continuing for an additional hour. The precipitate was then filtered, washed with ether, and after drying was found to weigh the theoretical 4.05 grams. The sodium enolate gave an orange-red color with aqueous ferric chloride. Acidification of an aqueous solution of the sodium enolate gave a bright yellow precipitate of 3 - acetoxy - 21 - formyl - 5,16.- pregnadiene - 20 - one which turned slightly red in color on drying. The infrared absorption spectrum of the material exhibited a major peak at $1618^{-1}$ centimeters typical of an enolic compound.

In the same manner, the following compounds are prepared by reacting the selected 20-ketosteroid with an alkyl formate, preferably methyl or ethyl formate, in the presence of an alkali-metal base, preferably sodium methoxide or ethoxide or potassium tertiary butoxide: 3β-acetoxy-21-formyl-5-pregnene-20-one from 3β-acetoxy-5-pregnene-20-one (pregnenolone acetate); 3β-acetoxy-16(17)-oxido-21-formyl-5-pregnene-20-one from 3β-acetoxy-16(17)-oxido-5-pregnene-20-one, the oxidation of the former compound with hydrogen peroxide according to the method of Example 1 is productive of 3β-acetoxy-16(17)-oxido-5-etiocholenic acid; and 3β-hydroxy-21-formyl-5-pregnene-20-one from 3β-hydroxy-5-pregnene-20-one, the oxidation of the latter compound according to the method of Example 1 yielding 3β-hydroxy-5-etiocholenic acid which, after crystallization from ether and pentane, melts at 241 to 242 degrees centigrade [Steiger and Reichstein, Helv. Chim. Acta, 20, 1040 (1937)].

*Example 5.—11-keto-21-formylprogesterone and sodium enolate*

In exactly the same manner as described in Example 1, using 3.28 grams (0.01 mole) of 11-ketoprogesterone, two milliliters of ethyl formate, in a reaction mixture formed by the distillation of a mixture of 3.4 milliliters of 3.4 N methanolic sodium methoxide, twenty milliliters of benzene, and 0.7 milliliter of anhydrous ethanol until eight milliliters of distillate had been collected, 2.35 grams of the sodium enolate of 11-keto-21-formylprogesterone was prepared as a yellow powder. An aqueous solution of the sodium enolate gave a pink color with ferric chloride. Acidification of an aqueous solution of the sodium enolate produced a precipitate of 11-keto-21-formylprogesterone melting at 85 to 90 degrees centigrade. The infrared absorption spectrum of the compound was consistent with the structure.

3,11-DIKETO-4-ETIOCHOLENIC ACID

A solution of 250 milligrams (0.0007 mole) of 11-keto-21-formylprogesterone in five milliliters of methanol was oxidized with one milliliter of thirty percent hydrogen peroxide at room temperature for three days. Distillation of the reaction mixture at reduced pressure and at room temperature left a residue of 3,11-diketo-4-etiocholenic acid which was extracted with aqueous sodium bicarbonate. Acidification of the extract precipitated the acid which was crystallized from ethyl acetate to yield 3,11-diketo-4-etiocholenic acid melting at 260 to 264 degrees centigrade. [Reported, Mason et al., J. Biol. Chem., 120, 719 (1937), M. P., 267 to 269 degrees centigrade.]

*Example 6.—11α-hydroxy-21-formylprogesterone and sodium enolate*

In the same manner as described in the foregoing examples, the sodium enolate of 11α-hydroxy-21-formylprogesterone is prepared from 11α-hydroxyprogesterone [Peterson and Murray, J. Am. Chem. Soc., 74, 1871 (1948)] by the reaction of the latter compound with methyl formate in the presence of sodium ethoxide and acidification of an aqueous solution of the sodium enolate is productive of 11α-hydroxy-21-formylprogesterone.

Similarly, the following compounds are prepared by the reaction of the selected 20-ketosteroid with an alkyl formate, preferably methyl or ethyl formate, in the presence of an alkali-metal base, preferably sodium methoxide or ethoxide or potassium tertiary butoxide: 21-formyl-16-dehydroprogesterone from 16-dehydroprogesterone, 21-formylprogesterone from progesterone, 11β-hydroxy-21-formylprogesterone from 11β-hydroxyprogesterone, and the like.

Oxidation of 21-formylprogesterone with hydrogen peroxide according to the method of Example 1 is productive of 3-keto-4-etiocholenic acid which melts, after crystallization from acetone, at 236 to 242 degrees centigrade [Steiger and Reichstein, Helv. Chim. Acta, 20, 1040 (1937)].

Similarly, 3-keto-11β-hydroxy-4-etiocholenic acid is prepared from 11β-hydroxy-21-formylprogesterone, the former compound melting at 253 to 258 degrees centigrade [ibid., 20, 1040 (1937)].

The potassium enolate of any of the compounds of Examples 1 through 6 are prepared by substituting a potassium base, preferably potassium tertiary butoxide, for the sodium methoxide or ethoxide in the reaction. Similarly, other alkali-metal enolates of the above-described compounds and others are prepared by substituting the selected alkali-metal base, preferably an alkali-metal alkoxide, in the above-described reactions.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A process which comprises the step of contacting, in the presence of an alkali-metal base under essentially anhydrous conditions and in an organic solvent for the reaction, a steroid represented by the following formula:

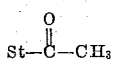

wherein St represents a cyclopentanopolyhydrophenanthrene nucleus attached to the above-identified side chain at carbon atom 17, with an alkyl formate to produce a useful alkali-metal enolate of a 20-keto-21-formylsteroid.

2. The process of claim 1 wherein the alkyl formate is selected from the group consisting of methyl and ethyl formate.

3. A process for the production of an alkali-metal enolate of a 20-keto-21-formylsteroid which comprises: contacting, in the presence of an alkali-metal alkoxide under essentially anhydrous conditions and in an organic solvent for the reaction, a steroid represented by the following formula:

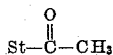

wherein St represents a cyclopentanopolyhydrophenanthrene nucleus attached to the above-identified side chain at carbon atom 17, with an alkyl formate, at a temperature between about zero degrees centigrade and the boiling point of the reaction mixture, to produce a useful alkali-metal enolate of a 20-keto-21-formylsteroid.

4. The process of claim 3 wherein the alkali-metal alkoxide is sodium methoxide.

5. A process which comprises the step of contacting a steroid represented by the following formula:

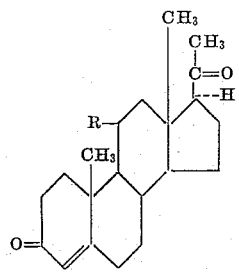

wherein R is selected from the group consisting of hydrogen, α-hydroxy, β-hydroxy, and ketonic oxygen (=O), in the presence of an alkali-metal base under essentially anhydrous conditions and in an organic solvent for the reaction, with an alkyl formate, at a temperature between about zero degrees centigrade and the boiling point of the reaction mixture, to produce an alkali-metal enolate of a 21-formylprogesterone.

6. The process of claim 5 wherein the alkali-metal base is an alkali-metal alkoxide.

7. A process for the production of the sodium enolate of 21-formylprogesterone which comprises: contacting progesterone, under essentially anhydrous conditions in the presence of about a molar equivalent of a sodium alkoxide and in an organic solvent for the reaction, with an alkyl formate at a temperature between about zero degrees centigrade and the boiling point of the reaction mixture, to produce the sodium enolate of 21-formylprogesterone.

8. A process for the production of the sodium enolate of 11α-hydroxy-21-formylprogesterone which comprises: contacting 11α-hydroxyprogesterone, under essentially anhydrous conditions in the presence of about a molar equivalent of a sodium alkoxide and in an organic solvent for the reaction, with an alkyl formate at a temperature between about zero degrees centigrade and the boiling point of the reaction mixture, to produce the sodium enolate of 11α-hydroxy-21-formylprogesterone.

9. A process for the production of the sodium enolate of 11β-hydroxy-21-formylprogesterone which comprises: contacting 11β-hydroxyprogesterone, under essentially anhydrous conditions in the presence of about a molar equivalent of a sodium alkoxide and in an organic solvent for the reaction, with an alkyl formate at a temperature between about zero degrees centigrade and the boiling point of the reaction mixture, to produce the sodium enolate of 11β-hydroxy-21-formylprogesterone.

10. A process for the production of the sodium enolate of 11-keto-21-formylprogesterone which comprises: contacting 11-keto-progesterone, under essentially anhydrous conditions in the presence of about a molar equivalent of a sodium alkoxide and in an organic solvent for the reaction, with an alkyl formate at a temperature between about zero degrees centigrade and the boiling point of the reaction mixture, to produce the sodium enolate of 11-keto-21-formylprogesterone.

11. A steroid having a 17-side chain and represented in its enolic form by the following formula:

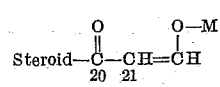

wherein M is selected from the group consisting of hydrogen and an alkali metal and wherein steroid is an oxygenated 10,13 - dimethylcyclopentanopolyhydrophenanthrene nucleus, said oxygenation being the sole substitution and being present at no more than three nuclear positions, said oxygenation being further restricted to the 3-, 11-, and 17-positions.

12. A compound of claim 11 wherein M is hydrogen.

13. A compound of claim 11 wherein M is sodium.

14. A compound selected from the group consisting of a steroid represented in its enolic form by the following formula:

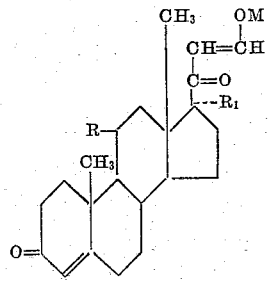

and a steroid represented in its enolic form by the following formula:

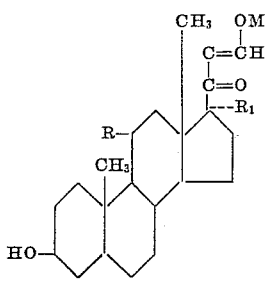

wherein R is selected from the group consisting of hydrogen, α-hydroxy, β-hydroxy, and ketonic oxygen (=O), R₁ is selected from the group consisting of hydrogen and hydroxyl, and M is selected from the group consisting of hydrogen and alkali metals.

15. A compound of claim 14 in which M is an alkali metal.
16. A compound of claim 14 in which R is α-hydroxy.
17. The sodium enolate of 21-formylprogesterone.
18. The sodium enolate of 11α-hydroxy-21-formylprogesterone.
19. The sodium enolate of 11β-hydroxy-21-formylprogesterone.
20. The sodium enolate of 11-keto-21-formylprogesterone.

References Cited in the file of this patent
UNITED STATES PATENTS
2,554,473    Ruschig _____ May 22, 1951